United States Patent [19]

Schack et al.

[11] Patent Number: 4,943,442
[45] Date of Patent: Jul. 24, 1990

[54] METHOD AND APPARATUS FOR CRUST-FREEZING AND SLICING OF COMMINUTED MEAT PRODUCTS

[75] Inventors: Warren R. Schack, Leawood; Richard G. Powers, Overland Park, both of Kans.

[73] Assignee: Marlen Research Corporation, Overland Park, Kans.

[21] Appl. No.: 236,831

[22] Filed: Aug. 26, 1988

Related U.S. Application Data

[63] Continuation-in-part of Ser. No. 180,309, Apr. 12, 1988, abandoned.

[51] Int. Cl.$^5$ .......................... A22C 7/00; A23P 1/00
[52] U.S. Cl. .................................. 426/513; 62/380; 426/518; 426/524
[58] Field of Search ............... 426/513, 516, 518, 524, 426/646; 17/32; 62/64, 380; 425/378.1

[56] References Cited

U.S. PATENT DOCUMENTS

| | | | |
|---|---|---|---|
| 1,773,080 | 6/1927 | Birdseye | 426/643 |
| 1,943,019 | 1/1934 | Henney et al. | 62/64 |
| 1,950,763 | 3/1934 | Walter | 99/351 |
| 2,013,610 | 10/1934 | Karpiloff | 17/32 |
| 2,203,318 | 7/1939 | Yerk | 426/513 |
| 2,397,446 | 9/1942 | Tansley | 17/32 |
| 2,521,849 | 9/1950 | Hopkins et al. | 426/264 |
| 2,565,245 | 8/1951 | Lebovitz | 100/38 |
| 2,641,797 | 6/1953 | Waltman | 17/32 |
| 2,670,296 | 2/1954 | Tansley | 426/513 |
| 2,916,986 | 12/1959 | Lebovitz | 426/518 |
| 2,917,388 | 12/1959 | Sullivan et al. | 426/518 |
| 2,953,461 | 9/1960 | Prohaska | 99/352 |
| 3,060,036 | 10/1962 | Van Dolah | 426/393 |
| 3,063,842 | 11/1962 | Poderbradsky | 426/513 |
| 3,101,757 | 8/1963 | Hanson | 62/64 |
| 3,108,883 | 10/1963 | Goeser | 426/518 |
| 3,151,991 | 11/1964 | Evans et al. | 426/524 |
| 3,242,684 | 3/1966 | Sola | 62/65 |
| 3,287,761 | 11/1966 | Borsuk et al. | 17/32 |
| 3,413,818 | 12/1968 | Pelmulder | 62/63 |

(List continued on next page.)

FOREIGN PATENT DOCUMENTS 45-20937 of 0000 Japan.

OTHER PUBLICATIONS

French article titled "Les Nouvelles Techniques De Conditionnement Et De Conservation De La Viande"; author: Jean-Pierre Hullin (partial translation attached).

Article entitled "Liquid Nitrogen Freezing Counters Rising Labor, Raw Material Cost"; author: A. N. Kivert and J. T. Sills.

Article entitled "Liquid Nitrogen Freezing of Poultry Products"; author: Joseph P. Ryan.

Article entitled "Liquid Nitrogen's Quality Claim in the Freezing of Baked Goods"; author: Douglas L. McIntyre.

Primary Examiner—George Yeung
Attorney, Agent, or Firm—Hovey, Williams, Timmons & Collins

[57] ABSTRACT

An improved method and apparatus is provided for the crust-freezing and slicing of comminuted meat products in order to produce patties, all without the use of conventional casings and freeze/temper cycles. The preferred method involves supplying an elongated, preformed body (60a, 160a) of substantially uncooked, peripherally unrestrained comminuted meat, typically through use of a pumping device (12, 112) and an associated delivery horn (18, 118). The preformed meat bodies are then subjected to a cryogenic freezing operation in order to form a continuous circumscribing peripheral frozen crust (62) and a non-frozen central section (64) in each body (60a, 160a). The crust frozen bodies (60a, 160a) are suitable for direct slicing to yield the desired patties. Handling of the bodies (160a) can be accomplished by direct immersion of a meat stream (160) in a cryogenic fluid (125a) in a freezer (122), followed by a downstream severing and patty formation. Alternately, use can be made of a conveyor (46) supporting plural, end-to-end, perforate racks (48) which receive comminuted meat from the pumping device (12) and support the same during crust-freezing in a freezer (22).

26 Claims, 2 Drawing Sheets

U.S. PATENT DOCUMENTS

| | | | |
|---|---|---|---|
| 3,421,178 | 1/1969 | Ammons et al. | 17/32 |
| 3,421,434 | 1/1969 | Krachmer | 426/513 |
| 3,462,793 | 8/1969 | Sumption | 17/32 |
| 3,480,449 | 11/1969 | Sumption | 426/513 |
| 3,485,055 | 12/1969 | Webster et al. | 62/63 |
| 3,587,689 | 6/1971 | Bettcher | 83/121 |
| 3,728,136 | 4/1973 | Langlands | 426/513 |
| 3,803,958 | 4/1974 | Fernandez-Moran | 83/170 |
| 3,851,355 | 12/1974 | Hughes | 17/32 |
| 3,852,507 | 12/1974 | Toby | 426/513 |
| 3,889,013 | 6/1975 | Moule | 426/513 |
| 3,935,321 | 1/1976 | Sakler et al. | 426/244 |
| 4,060,998 | 12/1977 | Bernard | 426/524 |
| 4,068,008 | 1/1978 | Orchard | 426/513 |
| 4,148,598 | 4/1979 | Colosimo et al. | 17/32 |
| 4,205,415 | 6/1980 | Orchard | 17/32 |
| 4,207,281 | 6/1980 | Bernard | 426/513 |
| 4,258,066 | 3/1981 | Bernard | 426/646 |
| 4,268,532 | 5/1981 | Bernard | 426/513 |
| 4,280,618 | 7/1981 | Jensen | 198/782 |
| 4,293,979 | 10/1981 | Colosimo et al. | 17/32 |
| 4,325,221 | 4/1982 | Grewar | 62/63 |
| 4,349,575 | 9/1982 | Roth | 426/513 |
| 4,372,734 | 2/1983 | Dolan et al. | 426/512 |
| 4,379,356 | 4/1983 | Geissbuhler | 426/513 |
| 4,446,159 | 5/1984 | Roth | 426/249 |
| 4,483,046 | 11/1984 | Briddell | 426/513 |
| 4,530,132 | 7/1985 | Wagner | 17/32 |
| 4,539,210 | 9/1985 | O'Connell et al. | 426/513 |
| 4,544,560 | 10/1985 | O'Connell | 426/513 |
| 4,562,615 | 1/1986 | Anderson et al. | 17/32 |
| 4,614,489 | 9/1986 | Juravic | 426/513 |
| 4,660,467 | 4/1987 | Waks | 99/339 |
| 4,689,856 | 9/1987 | Gibson | 17/32 |
| 4,697,308 | 10/1987 | Sandberg | 17/32 |
| 4,709,449 | 12/1987 | Borsuk | 17/32 |
| 4,712,272 | 12/1987 | Soodalter | 17/32 |

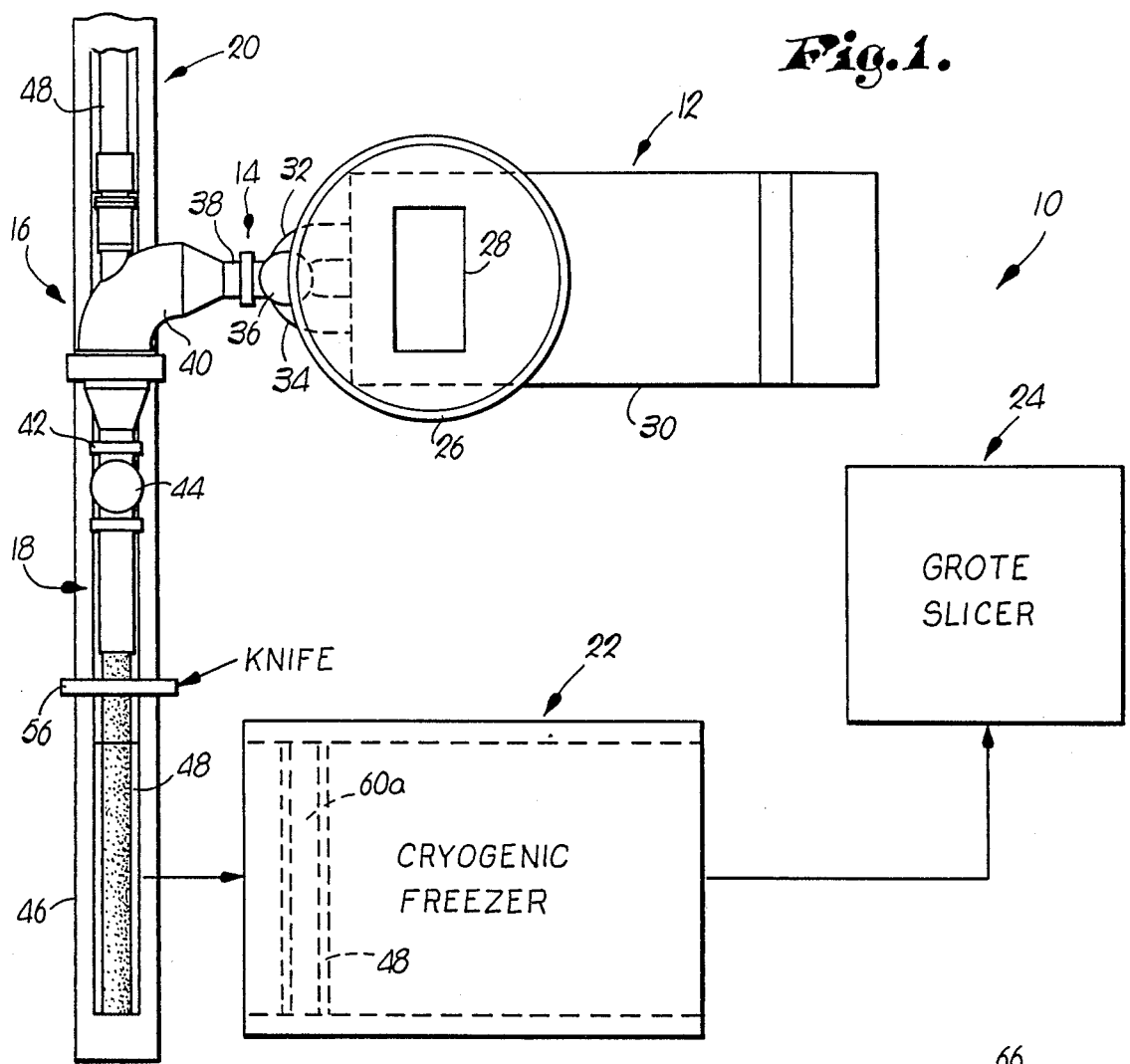
Fig. 1.
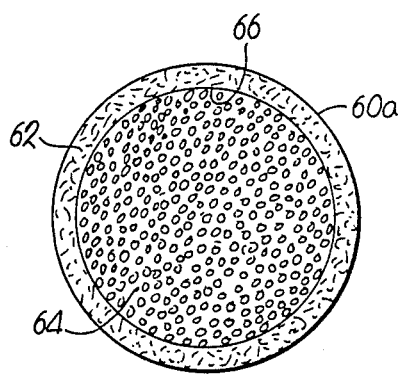
Fig. 4.
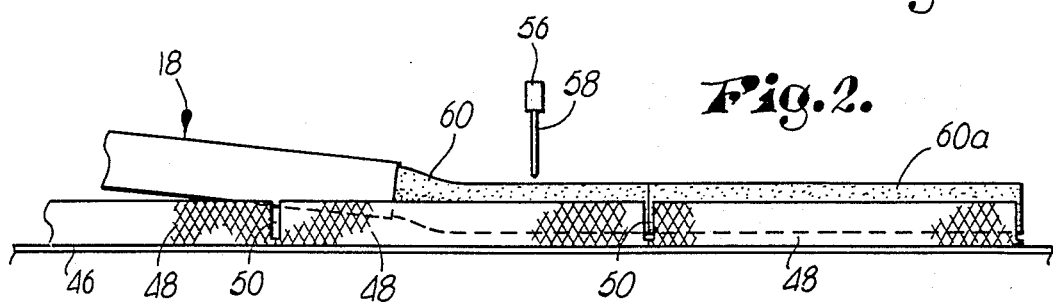
Fig. 3.
Fig. 2.

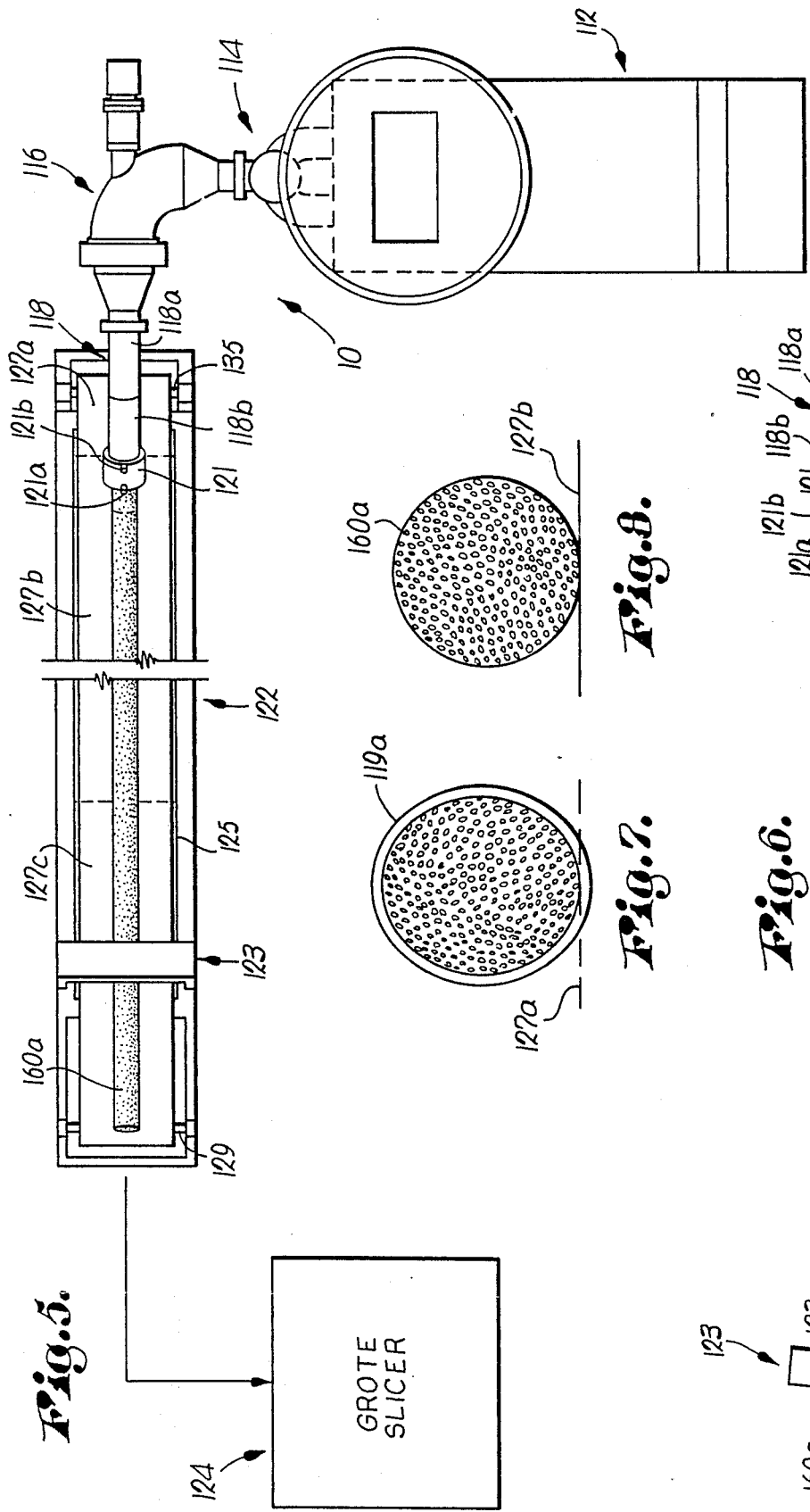

METHOD AND APPARATUS FOR CRUST-FREEZING AND SLICING OF COMMINUTED MEAT PRODUCTS

This application is a Continuation-in-part of indentically titled U.S. application Ser. No. 07/180,309, filed Apr. 12, 1988, now abandoned.

BACKGROUND OF THE INVENTION

1. Field of the Invention

The present invention is broadly concerned with an improved, low cost method and apparatus for producing comminuted meat products such as patties with the complete elimination of conventional casings typically used in patty formation. More particularly, it is concerned with such a process and apparatus wherein an elongated, preformed, uncased, peripherally unrestrained, generally substantially uncooked comminuted meat body is first crust-frozen to render the body substantially shape-retaining, followed by transverse slicing to yield patty products.

2. Description of the Prior Art

Comminuted meat products such as hamburger and sausage are often produced and sold in the form of patties, in order to facilitate handling and cooking by the ultimate end user. Typically, such patty products are produced by directing the comminuted meat into and through a stuffing horn, where the meat is encased in a skin or synthetic resin casing or an open-ended "slick", all such expedients being referred to herein as "casings." Thereupon, the encased meat is either partially or completely frozen, followed by a tempering step to put the meat in the optimum condition for slicing. Finally, the casing or slick is removed from the frozen/tempered meat, and the product is sliced to obtain the desired patties.

This type of process is quite conventional and of long standing. However, it is relatively expensive and cumbersome, because of the need to initially encase and seal the meat, followed by a freezing/tempering cycle.

An alternate process is described in U.S. Pat. No. 2,670,296. In this process, ground meat is initially extruded into an elongated block which is completely frozen to a temperature of from 10° to 25° F. below zero. At this point, the block is sliced to yield the desired patties. The process of this patent is deficient in that it contemplates complete freezing of the meat blocks, which can be time-consuming and expensive. By the same token, experience has shown that attempts to slice fully frozen meat bodies can be difficult and lead to shattering of the meat. Indeed, this is the very reason why conventional casing methods employ a tempering step prior to slicing.

It has also been suggested in the past to partially freeze whole muscle meat products such as pork loins, followed by cutting or slicing. However, even in these processes, the whole muscle products are typically pressed and formed during the slicing operation. Thus, U.S. Pat. No. 3,852,507 describes a process wherein an irregular meat mass is formed by a die mechanism into a predetermined shape while the meat is partially frozen. Such pressing and the resultant peripheral restraint on the meat tends to cause undue compaction, however, and the resultant sliced product may exhibit undesirable organoleptic properties.

U.S. Pat. No. 3,926,080 describes a method for processing whole muscle products such as pork loin by initial crust-freezing in liquid nitrogen, followed by severing of the loin into chops. This reference does not suggest or intimate, however, any method for forming comminuted products such as hamburger or the like using a crust-freezing technique.

Other references describing various meat forming methods include U.S. Pat. Nos. 4,258,006, 4,268,532, 4,372,734, 1,943,019, 2,397,446, 2,521,849, 2,641,797, 3,421,434, 3,851,355, 3,889,013, 4,068,008, 4,205,415, 4,349,575, 4,530,132, 4,539,210, 4,544,560, 4,060,998, and 3,108,883.

SUMMARY OF THE INVENTION

The present invention overcomes the problems described above and provides a greatly improved method and apparatus for the formation of comminuted meat products such as sausage or hamburger patties. Broadly speaking, the method of the invention includes the steps of supplying an elongated, preformed body of peripherally unrestrained comminuted meat (e.g., a cylindrical log or segment), followed by crust-freezing of the meat body in an uncased, peripherally unrestrained condition to render the same substantially shape-retaining. As used herein "peripherally unrestrained" refers to the fact that the meat body is not in contact with rigid surrounding structure restraining the entire circumferential periphery thereof, as in the case of a die freezing tube of the type shown in U.S. Pat. No. 3,852,507; it is contemplated that the peripherally unrestrained meat body may be supported on a rack or similar structure, however. This crust-freezing process creates a continuous, circumscribing, frozen peripheral meat crust extending the full length of the body, together with a non-frozen central meat portion. Furthermore, the crust-frozen meat body has been found to be entirely satisfactory for direct slicing in an uncased condition, and therefore the final step in the method involves transversely subdividing the crust-frozen meat body to give the desired final products.

In particularly preferred forms of the invention, the preformed, uncased meat body is substantially uncooked (although partial cooking of the meat is possible and is within the ambit of the invention), and such body is crust-frozen until the resultant peripheral crust portion has an effective thickness of from about 1/16 to ½ inch. To this end, a cryogenic freezing process is preferred, wherein use is made of a freezing fluid (e.g., liquid or gaseous nitrogen) at a temperature of from about −80° to −380° F. Furthermore, the meat is advantageously supplied by delivering an elongated, preformed, continuous stream thereof directly into the freezing fluid (e.g., a quantity of liquid nitrogen) without any direct support. This permits a very thin stabilization crust to be substantially immediately formed on the periphery of the meat. In order to ensure that the resultant product has the desired cross-sectional shape, it is preferred to supply the body to the liquid nitrogen bath in a shape slightly different than the ultimate desired shape, and to allow the action of gravity to bring the product to its desired shape during the crust-freezing sequence. Hence, if circular in cross-section patties are the desired product, the comminuted meat stream may be supplied to the nitrogen bath in a substantially oval shape; as the comminuted meat enters the bath therefore, it "sags" into a substantially circular shape and is thereupon crust-frozen.

The stream of comminuted meat entering the crust-freezing bath advantageously contacts and is supported by a conveyor or similar device within the liquid nitrogen tank to complete the crust-freezing operation. After crust-freezing is complete, the continuous meat stream may be periodically severed for ease of patty formation. In another embodiment, the un cased meat stream may be supported using plural shiftable support means typically in the form of perforate racks. The supported meat stream is periodically severed as the racks are loaded to form discrete bodies of the comminuted meat, and the rack-supported meat segments are thereupon crust-frozen. It will be appreciated that in this embodiment the meat segments are peripherally unrestrained, even though they rest upon portions of the respective racks.

In terms of the preferred apparatus of the invention, it has been found particularly desirable to employ a Marlen twin piston pump of the type commercialized by Marlen Research Corporation of Overland Park, Kansas, for continuous delivery of chilled meat into and through a meat delivery horn. In certain cases, it is also preferred to employ a Marlen in-line grinder between the pump outlet and delivery horn, in order to properly size the meat product.

BRIEF DESCRIPTION OF THE DRAWING

FIG. 1 is a schematic plan view of meat product forming apparatus of the invention;

FIG. 2 is an essentially schematic, fragmentary side view illustrating the meat delivery horn, shiftable rack device and meat severance assembly forming a part of the overall apparatus;

FIG. 3 is an end view illustrating the configuration of a perforate, transversely arcuate meat body-supporting rack, with a meat body therein;

FIG. 4 is a sectional view illustrating a crust-frozen meat body;

FIG. 5 is a schematic plan view of the most preferred apparatus in accordance with the invention;

FIG. 6 is a sectional view illustrating the construction of the crust-freezing device illustrated in FIG. 5;

FIG. 7 is a schematic representation illustrating an essentially oval-shaped comminuted meat stream outlet tube, depicting the shape of the meat stream as it enters the liquid nitrogen bath and is initially supported on the bath conveyor; and FIG. 8 is an end view of a circular in cross-section, crust-frozen comminuted meat body resulting from the initial stream depicted in FIG. 7.

DESCRIPTION OF THE PREFERRED EMBODIMENT

Turning now to the drawing, a patty-forming apparatus 10 is illustrated in FIG. 1. Apparatus 10 broadly includes a meat pumping device 12 having an outlet 14; an in-line meat grinding assembly 16; and a meat delivery horn 18. In addition, the apparatus 10 has a meat conveyor referred to by the numeral 20 situated below and in alignment with horn 18, together with a cryogenic freezer 22 and a final slicer 24.

In more detail, the pumping device 12 is of conventional design and is preferably in the form of a dual piston pump commercialized by Marlen Research Corporation of Overland Park, Kansas. Pumps of this character are described in U.S. Pat. Nos. 4,097,962 and 4,700,899 incorporated by reference herein. Generally speaking however, the pump 12 includes an upright hopper 26 leading to and communicating with a meat inlet 28. A pair of reciprocable piston/sleeve pairs (not shown) are situated within the main pump body 30 and communicate with opening 28. The piston/sleeve pairs are alternately operable for successive delivery of charges of comminuted meat through outlet pipes 32, 34. The latter are interconnected with a valve 36 which in turn is connected to a final outlet pipe 38 defining the outlet structure 14.

In the embodiment illustrated, an in-line grinder 16 is provided. This grinder is of the type described in U.S. Pat. No. 4,479,614, also incorporated by reference herein. Briefly, the grinder 16 includes an arcuate housing 40 with an internal grinder plate and associated, multiple blade, powered grinding knife (not shown) for the purpose of reducing the meat product delivered from pump 12 prior to downstream processing. The outlet end 42 of grinder 16 communicates with a conventional product valve 44, the latter leading to the upstream end of horn 18 as shown.

Meat conveyor 20 includes an elongated, continuous, powered belt 46 which is oriented beneath and in substantial longitudinal alignment with horn 18. The belt 46 is adapted to support a series of elongated, perforate, end-to-end aligned meat-supporting racks 48 (see FIG. 2). The racks 48 are designed to present upright slots 50 therebetween, the purpose of which will be made clear hereinafter. With particular reference to FIG. 3, it will be observed that each rack 48 includes a pair of upright, spaced apart, belt-engaging sides 54, together with a central, arcuate, upwardly open, meat-supporting section 56 between the sides 54. At least the central portion 56 is perforate so as to facilitate complete crust freezing of meat products in a manner described more fully below.

The overall conveyor apparatus 20 further includes a meat severing device 56 situated above belt 46 and having a blade 58 adapted to move downwardly and be received within the slots 50 between the racks 48 during patty-forming operations.

The freezer 22 is of conventional design and can make use of a variety of well-known cryogenic freezing materials, most preferably liquid nitrogen. In the form shown, the freezer 22 is sized to receive, in serial order, the respective meat-supporting racks 48 carrying individual, preformed, uncased meat bodies, so as to sequentially crust-freeze the latter. The particular freezer 22 is moreover designed to effectively dip the respective meat bodies within a bath of liquid nitrogen, in order to effect the desired crust freezing.

The slicer 24 is a wholly conventional, commercially available device obtained from the J. E. Grote Company of Columbus, Ohio, as Model No. S A 522.2. It is believed that the slicer is described in U.S. Pat. Nos. 3,633,450, 3,760,715, 4,230,007, and 4,436,012, all of which are incorporated by reference herein. Of course, other commercially available slicers could also be used in lieu of the Grote slicer.

In the operation of apparatus 10 to produce uncooked pork sausage patties, the comminuted meat product ingredients are typically coarsely preground, scaled to the desired formula fat content, and mixed with appropriate spices and seasonings. The blend is then chilled to less than 32° F., preferably about 26° F. This chilled blend is then dumped into the hopper 26, whereupon it is pumped into and through grinder 16 equipped with a plate having desired openings (e.g., 5/32 of an inch), and with the rpm of the grinder knife being set for the cut length desired (e.g. 3/16 inch). After grinding, the meat is directed through valve 44 and ultimately into and through horn 18. As best seen in FIG. 2, the meat is delivered from horn 18 onto the moving, end-to-end aligned racks 48 as a continuous stream 60. In typical patty forming operations, the stream 60 would have a diameter of about 2½ inches, whereas each rack 48 would have a length of approximately 30 inches. As each slot 50 passes under the device 56, blade 58 is actuated in order to sever the continuous stream 60 into discrete, rack-supported logs or segments 60a.

The individual segments 60a, each supported upon a rack 48 in a peripherally unrestrained manner, are next moved either manually or through appropriate conveying means into the freezer 22. At this point, the segments 60a are subjected to a cryogenic crustfreezing operation wherein the cryogenic fluid directly contacts essentially the entire outer periphery of each segment 60a. In the illustrated embodiment, each segment 60a passes through liquid nitrogen to create a peripheral, continuous, circumscribing, frozen crust 62 and a non-frozen central section 64 in the segment (see FIG. 4). The continuous, curcumscribing crust 62 advantageously has an effective thickness of from about 1/16 to ½ inch, and more preferably from about 1/8 to about 3/16 of an inch, and extends the entire length of the segment 60a. The non-frozen section 64 remains essentially at the temperature of the meat at the grinder discharge; however, the interface 66 between the crust 62 and central section 64 is typically at a temperature of from about 10° to 20° F. and most preferable about 14°–16° F. When using the liquid nitrogen dip cryogenic freezing, such conditions in the segment 60a are accomplished with a 15 to 20 second dip time exposure for each segment 60a, using about −380° F. liquid nitrogen.

The crust-frozen segments 60a are next transferred to the slicer 24 without any intermediate treatment such as further shaping or the like (i.e., the segments are maintained in their crust-frozen shape), whereupon they are conventionally sliced as patties in a direction transverse to the longitudinal axis of the segment. The patties can then be packaged for fresh or frozen distribution, at the discretion of the operator.

The above example is particularly suited for the production of pork-containing patties, e.g., sausage products. In the case of beef patties, the conditions are essentially the same, except that they are generally produced without seasonings and through use of a ⅛ inch plate in the grinder with a grinder knife speed to achieve a cut length of from 3/32 to ⅛ of an inch and a 29°–30° F. beef temperature at the grinder discharge. After grinding, the comminuted beef is formed into elongated segments with diameters according to desired ultimate patty weights, generally 4 to 5 inches. The dwell time for such beef patties in the cryogenic freezer would also be increased, but would be generally approximately 24–36 seconds.

FIGS. 5 and 6 depict another more preferred embodiment of the invention which eliminates use of the racks 48. To this end, a patty-forming device 110 as illustrated in FIGS. 5 and 6 broadly includes a pumping device 112 having an outlet 114, together with in-line meat grinding assembly 116 terminating in a meat delivery horn 118. In addition, the apparatus 110 includes cryogenic freezing device 122 equipped with a segment severing head 123, and a final slicer 124. The pumping device 112, grinder assembly 116 and 124 are identical with the corresponding slicer elements 12, 16, and 24 described with reference to the first embodiment, and therefore a detailed discussion of these elements is omitted. However, it will be seen that the valve 44 is omitted and that horn assembly 118 is somewhat modified as compared with the first embodiment. In particular, the horn assembly 118 includes a first, generally horizontally oriented tubular segment 118a, together with an obliquely and downwardly oriented outlet segment 118b terminating in a meat outlet opening 119. A jacket 121, having a heating fluid inlet 121a and a fluid outlet 121b, is positioned on section 118b adjacent outlet opening 119 for purposes which will be made clear hereinafter.

The crust-freezing device 122 includes an insulated chamber 125 adapted to hold a supply of liquid nitrogen 125a, together with a specially configured endless conveyor 127. The latter is trained about corresponding pulley assemblies 129, 131, 133, and 135, as well as appropriate guides (not shown) so that the conveyor 127 assumes a configuration with an initial downwardly oriented stretch 127a adjacent and below the section 118b, along with generally horizontally extending stretch 127b and a final, gently upwardly inclined exit stretch 127c leading out of chamber 125.

The severing head 123 is of conventional construction, and includes a downwardly extending, reciprocable severing blade 123a which can operate in timed relationship to the overall apparatus for producing logs or segments of desired length.

In the operation of apparatus 110 to produce patties or the like, the initial meat ingredients are fed into the hopper of pump 112 and are fed through grinder 116 and ultimately into and through the delivery horn 118. As the meat stream 160 exits from the outlet opening 119 (see FIG. 6), it will be appreciated that the meat first contacts the liquid nitrogen 125a within chamber 125. This occurs prior to the meat actually coming into engagement with the stretch 127a of conveyor 127. During this period of time, prior to contact with the conveyor stretch, the meat is being fed without any direct support whatsoever, and a very thin stabilization crust is almost immediately formed on the meat stream 160. This crust is sufficient to assist in holding the meat stream 160 together, but is insufficient to induce cracking or tearing of the meat as the meat traverses the bend between the conveyor stretches 127a, 127b. As a consequence, the meat smoothly flows and is supported by the conveyor 127 throughout the chamber 125. The immersion time of the meat in the liquid nitrogen is timed to be sufficient to form the desired circumscribing meat crust on the meat stream so that, as the meat stream 160 emerges from the immersion bath or stretch 127c, it is entirely crust-frozen in the manner described previously. At this point, the meat stream encounters the assembly 123, which is operated in a timed relationship in order to produce segments or logs 160a of desired length (e.g., from 30 to 42 inches in length). The slicing operation in slicer 124 then proceeds in the manner described above, i.e., the crust-frozen segments 160a are fed into the slicer for transverse slicing thereof to produce the desired patties.

The embodiment of FIGS. 5 and 6 is particularly advantageous inasmuch as there is a complete elimination of the racks 48 described with reference to the first embodiment. This is not only a cost saving, but eliminates the possibility that meat may become inadvertently adhered to the rack structures during the crust-freezing operation.

In order to further enhance the operability of apparatus 110, the heating jacket 121 is provided adjacent outlet opening 119. In particular, it is desirable to maintain the horn outlet at a temperature which prevents substantial chilling of the meat prior to entry thereof to the liquid nitrogen bath. Such undesirable chilling can cause the meat to adhere to the horn itself, which can degrade the product. In practice, warm water is circulated through the jacket structure 121, making use of the inlet 121a and outlet 121b for this purpose. Warm water at a temperature of, e.g., 120° F. may be circulated through the jacket to good effect.

In another refinement of the invention, as depicted in FIG. 7, the horn assembly 118 is provided with an outlet opening 119a which is generally oval in cross-section, with the major axis of the oval being transverse to the longitudinal axis of conveyor stretch 127a. In this embodiment, the comminuted meat stream passing from the opening 119a is permitted to slightly "sag" under the influence of gravity during the initial crust-freezing step, so that, ultimately, the final meat stream 160a (see FIG. 8) assumes a more desirable circular cross-section.

Pork sausage patties produced using the abovedescribed embodiment invention exhibit excellent organoleptic properties upon cooking. That is to say, conventional sausage patties may exhibit an undesirable "bulge" in the center thereof during cooking, requiring the use of a pressing device on the top of the sausage patties to ensure even cooking. Moreover, such prior patties often exhibit a toughness which is undesirable to the consumer. Patties produced in accordance with the present invention, however, lie essentially flat during the cooking process and moreover are more tender. This is believed to result in part from the fact that during the formation of the initial meat stream, and during crust freezing thereof, of, the meat is peripherally unrestrained, as compared with prior art processes.

We claim:

1. A method of forming a comminuted meat product without the use of a casing, said method comprising the steps of:
   supplying an elongated, preformed body of comminuted meat in an uncased, peripherally unrestrained condition;
   crust-freezing said meat body in said uncased, peripherally unrestrained condition to render the body substantially shape-retaining and to form a continuous, circumscribing frozen peripheral meat crust extending the full length of the body, and a non-frozen central meat portion,
   said crust-freezing step including the step of causing direct contact between the outer surface of the meat body and a freezing fluid; and
   substantially immediately subdividing said crust-frozen meat body before the body is allowed to substantially temper and while the body substantially retains said crust-frozen condition with said frozen crust and non-frozen central meat portion, said subdividing step comprising subdividing the body in a direction generally transverse to the longitudinal axis of the body and through said circumscribing frozen meat crust, to yield said meat product.

2. The method of claim 1, including the step of crust-freezing said body until said crust portion has an effective thickness of from about 6/16 to ½ inch.

3. The method of claim 1, including the step supplying said comminuted meat as an elongated, substantially cylindrical body.

4. The method of claim 1, said supplying step comprising the steps of:
   delivering an elongated, preformed, continuous stream of comminuted meat;
   supporting said continuous stream using shiftable support means; and
   periodically severing said stream to form discrete bodies of comminuted meat.

5. The method of claim 1, said crust-freezing step being carried out by using freezing fluid at a temperature of from about −80° to −380° F.

6. The method of claim 1, said subdividing step comprising the step of slicing said crust-frozen meat body to form a plurality of patties.

7. The method of claim 1, said supplying step comprising the steps of passing said body directly into a crust-freezing chamber without external support, forming an initial frozen crust on the body sufficient to assist in holding the body together, and thereafter completing said crust-freezing step.

8. The method of claim 1, said body of meat being substantially uncooked.

9. The method of claim 1, said preformed body of comminuted meat being supplied in an initial cross-sectional shape different than the final cross-sectional shape desired for said subdivided meat product, and causing said body to change its cross-sectional shape and assume said final cross-sectional shape prior to the completion of said crust-freezing step.

10. Apparatus for forming comminuted meat products without the use of a casing, said apparatus comprising:
    means for supplying an elongated, preformed body of comminuted meat in an uncased, peripherally unrestrained condition;
    means for crust-freezing said preformed meat body in said uncased, peripherally unrestrained condition to render the body substantially shape-retaining and to form a continuous, circumscribing, frozen peripheral meat crust extending the full length of the body, and a non-frozen central meat portion,
    said crust-freezing means including structure for bringing the outer surface of the meat body into direct contact with a freezing fluid; and
    means for receiving and substantially immediately subdividing said crust-frozen meat body before the body is allowed to substantially temper and while the body substantially retains said crust-frozen condition with said frozen crust and non-frozen central meat portion, said receiving and subdividing means including structure for subdividing the body in a direction generally transverse to the longitudinal axis of the body and through said circumscribing frozen meat crust, to yield said meat product.

11. The apparatus as set forth in claim 10, said meat-supplying means comprising a pump and a meat-delivery horn operably coupled to the output of said pump.

12. The apparatus as set forth in claim 11, including structure for maintaining said horn outlet at a temperature to prevent substantial chilling of meat passing therefrom.

13. The apparatus as set forth in claim 10, said meat-delivery horn presenting an outlet opening for supplying of said body of comminuted meat, said outlet opening having a cross-sectional different than the desired cross-sectional configuration for said subdivided meat product.

14. The apparatus as set forth in claim 10, said temperature-maintaining means including a jacket surrounding said outlet for receiving a warming fluid.

15. The apparatus as set forth in claim 11, including grinding means interposed between said pump outlet and horn.

16. The apparatus as set forth in claim 10, including means for supporting said preformed meat body during crust-freezing of the meat body in said crust-freezing means.

17. The apparatus as set forth in claim 16, said meat-supporting means comprising an elongated, perforate rack for said preformed meat body.

18. The apparatus as set forth in claim 10, said crust-freezing means comprising a cryogenic freezer.

19. The apparatus as set forth in claim 10, said subdividing means comprising a slicer.

20. The apparatus as set forth in claim 10, said meat-supplying means including structure for delivering an elongated, continuous stream of meat, there being severance means for periodically severing said continuous meat stream to present discrete, preformed meat bodies.

21. The apparatus as set forth in claim 10, said meat-supplying means including a meat delivery output device oriented for passing said meat body directly to said crust-freezing means without external support, said crust-freezing means including structure for initially forming a thin frozen crust on said body sufficient to assist in holding the body together and for thereafter supporting the meat body while the body is fully crust-frozen, there being means for severing said fully crust-frozen body into segments prior to reaching said subdividing means.

22. A method of forming a comminuted meat product without the use of a casing, said method comprising the steps of:

supplying an elongated, preformed body of comminuted meat in an uncased, peripherally unrestrained condition, said body having an initial cross-sectional shape;

causing said body to assume a final cross-sectional shape different than said initial cross-sectional shape, and crustfreezing the meat body in said uncased, peripherally unrestrained condition to render the body substantially shape-retaining and to form a continuous, circumscribing frozen peripheral meat crust extending the full length of the body, and a non-frozen central meat portion, said meat body in said crust-frozen condition having said different cross-sectional shape, said crust-freezing step including the step of causing direct contact between the outer surface of the meat body and a freezing fluid; and subdividing said crust-frozen meat body in a direction generally transverse to the longitudinal axis of the body and through said circumscribing frozen meat crust, to yield said meat product.

23. The method of claim 22, said initial cross-sectional shape being substantially oval, and said different cross-sectional shape being substantially circular.

24. Apparatus for forming comminuted meat products comprising:

means for supplying an elongated body of comminuted meat having an initial cross-sectional shape;

means for receiving said body, for permitting the body to alter its cross-sectional shape and assume a final cross-sectional shape different than said initial cross-sectional shape, and for crust freezing the body to render it substantially shape-retaining and to form a continuous, circumscribing, frozen peripheral meat crust extending the full length of the body, and a non-frozen central meat portion; and means for subdividing said crust-frozen meat body to form said meat product.

25. The apparatus as set forth in claim 24, said supplying means including structure for supplying said body in an uncased, peripherally unrestrained condition.

26. The apparatus as set forth in claim 24, said crust-freezing means including structure for bringing the outer surface of the meat body into direct contact with a freezing fluid.

* * * * *